US012720523B2

(12) United States Patent
Fujishiro

(10) Patent No.: US 12,720,523 B2
(45) Date of Patent: Aug. 25, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 544 days.

(21) Appl. No.: 18/175,505

(22) Filed: Feb. 27, 2023

(65) Prior Publication Data

US 2023/0209534 A1 Jun. 29, 2023

Related U.S. Application Data

(63) Continuation of application No. PCT/JP2021/031249, filed on Aug. 25, 2021.

(30) Foreign Application Priority Data

Aug. 31, 2020 (JP) ................................ 2020-146146

(51) Int. Cl.
*H04W 72/12* (2023.01)
*H04W 76/27* (2018.01)
*H04W 88/06* (2009.01)

(52) U.S. Cl.
CPC ....... *H04W 72/1215* (2013.01); *H04W 76/27* (2018.02); *H04W 88/06* (2013.01)

(58) Field of Classification Search
CPC . H04W 72/1215; H04W 76/27; H04W 88/06; H04W 8/18; H04W 12/45; H04W 12/72; H04W 4/60
USPC .......................................................... 455/436
See application file for complete search history.

(56) References Cited

U.S. PATENT DOCUMENTS

2013/0303203 A1 11/2013 Wang et al.
2020/0037210 A1 1/2020 Rugeland et al.
2021/0314860 A1* 10/2021 Chen ................ H04W 52/0209
2022/0116908 A1* 4/2022 Chun .................... H04W 24/08
2022/0240079 A1* 7/2022 Lovlekar .............. H04W 68/12
2023/0047213 A1* 2/2023 Chen ....................... H04W 8/22
(Continued)

FOREIGN PATENT DOCUMENTS

JP 2020-507971 A 3/2020
WO 2013/110284 A1 8/2013

OTHER PUBLICATIONS

"3rd Generation Partnership Project; Technical Specification Group Services and System Aspects; Study on Support for Multi-USIM Devices"; Release 17; 3GPP TR 22.834 V17.1.0; Sep. 2019; pp. 1-16.

(Continued)

*Primary Examiner* — Hirdepal Singh
(74) *Attorney, Agent, or Firm* — Studebaker Brackett PLLC

(57) ABSTRACT

A communication control method according to an aspect is a communication control method using a user equipment, the user equipment including a first SIM corresponding to a first mobile network and a second SIM corresponding to a second mobile network. The communication control method includes transmitting, by the user equipment, timing information to the first mobile network in response to occurrence of a predetermined event, and the timing information indicates an execution timing that is a timing at which communication is executed in the second mobile network.

8 Claims, 12 Drawing Sheets

(56) References Cited

U.S. PATENT DOCUMENTS

2023/0057503 A1* 2/2023 Kanneath Abraham ..................... H04W 76/18
2023/0319754 A1* 10/2023 Jung ..................... H04W 68/02 370/329

OTHER PUBLICATIONS

Ericsson; "Paging collision avoidance"; Online; 3GPP TSG-RAN WG2 #111e, Tdoc R2-2007603; Aug. 17-28, 2020; Total 3 pages.

* cited by examiner

COMMUNICATION CONTROL METHOD

RELATED APPLICATIONS

The present application is a continuation based on PCT Application No. PCT/JP2021/031249, filed on Aug. 25, 2021, which claims the benefit of Japanese Patent Application No. 2020-146146 filed on Aug. 31, 2020. The content of which is incorporated by reference herein in their entirety.

TECHNICAL FIELD

The present invention relates to a communication control method.

BACKGROUND OF INVENTION

A user equipment needs to be equipped with a Subscriber Identity Module (SIM) in order to utilize a mobile communication service (voice call service, data communication service, or the like) provided by a communication operator (operator or communication carrier) via a mobile network. Once the user equipment is registered with the mobile network using the SIM, the user equipment can utilize the mobile communication service from the mobile network of the registration destination.

In recent years, a user equipment that can be equipped with a plurality of SIMs has been spread. A user equipment equipped with two SIMS (a first SIM and a second SIM) may utilize a mobile communication service from a first mobile network, which is a mobile network with which the first SIM is registered, and may utilize a mobile communication service from a second mobile network, which is a mobile network of with which the second SIM is registered. Discussions on use cases for using both mobile communication services has started in the Third Generation Partnership Project (3GPP) (e.g., Non-Patent Literature 1).

CITATION LIST

Non-Patent Literature

Non-Patent Literature 1: 3GPP Technical Report TR 22.834 "TR 22.834 V17.1.0" September 2019, Internet <URL: http://www.3gpp.org/ftp/Specs/archive/22_series/22.834/22834-h10.zip>

SUMMARY

A communication control method according to a first aspect is a communication control method using a user equipment, the user equipment including a first subscriber identity module (SIM) corresponding to a first mobile network and a second SIM corresponding to a second mobile network. The communication control method includes transmitting, by the user equipment, timing information to the first mobile network in response to occurrence of a predetermined event, and the timing information indicates an execution timing that is a timing at which communication is executed in the second mobile network.

DESCRIPTION OF EMBODIMENTS

In a user equipment, when a communication in a first mobile network and a communication in a second mobile network occur at the same time, one of the communications may not be performed. In particular, in a case that the first mobile network and the second mobile network belong to different communication operators, collaboration between the mobile networks makes it difficult to avoid such problems.

An object of the present disclosure is to enable a user equipment that can be equipped with a plurality of SIMS to appropriately perform communication in a plurality of mobile networks.

A mobile communication system according to embodiments is described with reference to the drawings. In the description of the drawings, the same or similar parts are denoted by the same or similar reference signs.

Mobile Communication System

A configuration of a mobile communication system according to an embodiment is described. While the mobile communication system according to an embodiment is a 3GPP 5G system, the 3GPP Long Term Evolution (LTE) may be at least partially applied to the mobile communication system.

Figure 1:
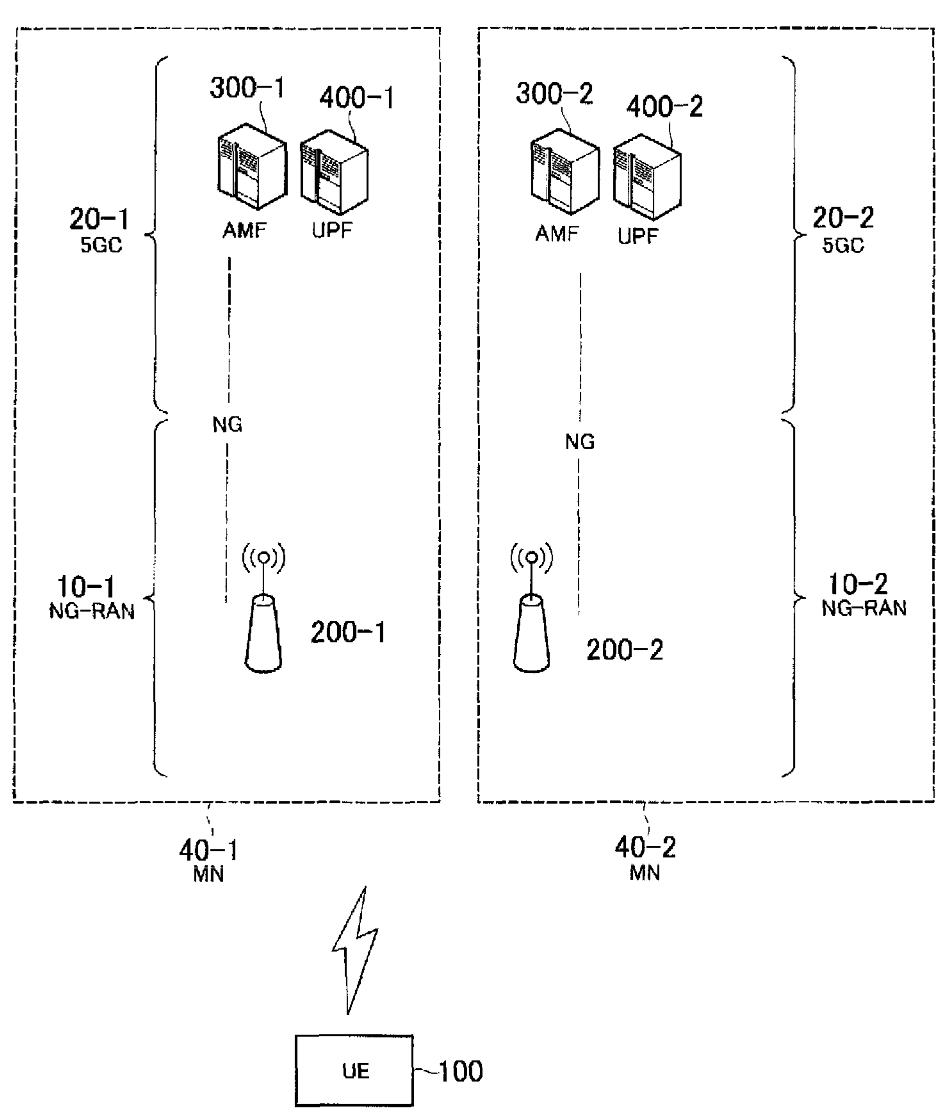
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a first mobile network (MN 40-1) operated by a first communication operator, a second mobile network (MN 40-2) operated by a second communication operator, and a User Equipment (UE) 100. The UE 100 can register with the MN 40-1 using a SIM 140-1 described later, and can register with the MN 40-2 using a SIM 140-2. The MN 40-1 and the MN 40-2 are hereinafter simply referred to as the MN 40 unless otherwise distinguished.

The MN 40 may be a network using the 5G technology, or may be a network using the LTE technology. FIG. 1 is an example where the MN 40 uses the 5G technology. The MN 40 includes a 5G radio access network (Next Generation Radio Access Network (NG-RAN)) 10, and a 5G core network (5GC) 20. When the MN 40 uses the LTE technology, the NG-RAN is interpreted as an Evolved-UMTS Terrestrial Radio Access Network (E-UTRAN), and the 5GC is interpreted as an Evolved Packet Core (EPC). When the MN 40 uses the LTE technology, a gNB described later is interpreted as an eNB, and an AMF described later is interpreted as a Mobility Management Entity (MME). A UPF described later is interpreted as a Serving Gateway (S-GW) and/or Packet Data Network Gateway (P-GW).

The UE 100 is a mobile apparatus. The UE 100 may be any type of apparatus so long as it is utilized by a user, and examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface (not illustrated) corresponding to an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB may be connected to an Evolved Packet Core (EPC) which is a core network of LTE, or a base station of LTE may be connected to the 5GC. The base station of LTE and the gNB may be connected via the inter-base station interface.

The 5GC 20 includes an Access and Mobility Management Function (AMF) 300 and a User Plane Function (UPF) 400. The AMF 300 performs various types of mobility controls and the like for the UE 100. The AMF 300 manages information of the area in which the UE 100 exists by communicating with the UE 100 by using Non-Access Stratum (NAS) signaling. The UPF 400 controls data transfer. The AMF 300 and the UPF 400 are connected to the gNB 200 via an NG interface which is an interface between the base station and the core network.

Figure 2:
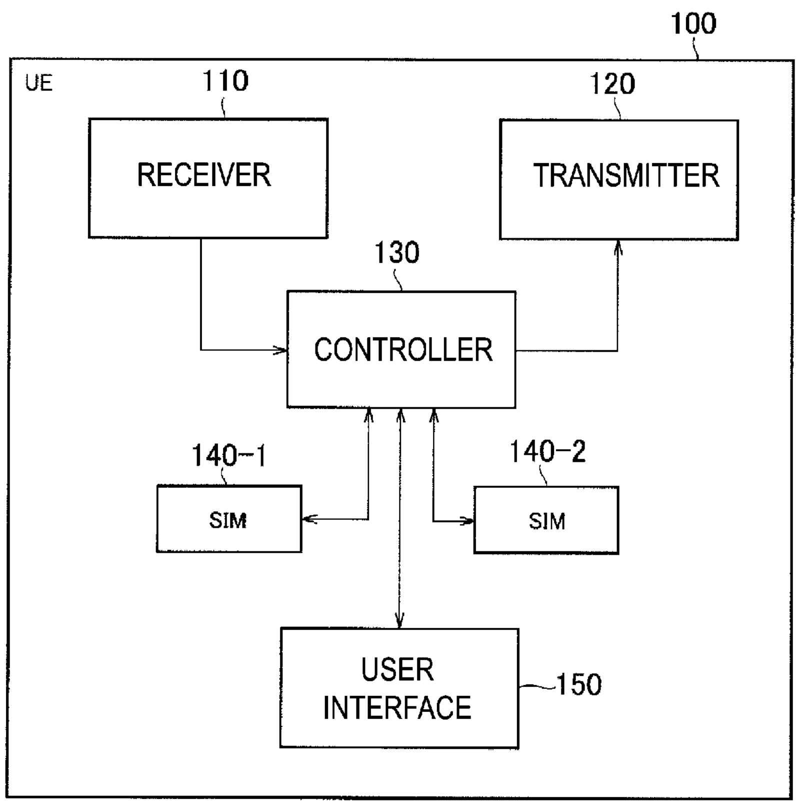
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, a controller 130, a SIM 140-1 (first SIM), a SIM 140-2 (second SIM), and a user interface 150. The UE 100 may include three or more SIMS 140.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory electrically connected to the processor. The memory stores a program to be executed by the processor and information to be used for processing by the processor. The processor may include a baseband processor and a central processing unit (CPU). The baseband processor performs modulation and demodulation, coding and decoding, and the like of a baseband signal. The CPU executes the program stored in the memory to thereby perform various types of processing.

The SIM 140 records information identifying a subscriber to receive a mobile communication service provided from the mobile network. In the SIM 140, information may be recorded that includes, in addition to information identifying a subscriber, operator identification information for identifying a communication operator, and information related to available services that a subscriber subscribes to. The SIM 140 may be an IC card referred to as a removable SIM card (or a USIM card), i.e., an information card. The SIM 140 may be an Embedded SIM (eSIM) which is of an embedded type.

Information recorded in the SIM 140-1 (first SIM) identifies a first International Mobile Subscriber Identity (IMSI) corresponding to an identification number assigned to a user of the UE 100 from a first communication operator operating the first mobile network 40-1. Information recorded in the SIM 140-2 (second SIM) identifies a second IMSI corresponding to an identification number assigned to the user of the UE 100 from a second communication operator operating the second mobile network 40-2. The SIM 140-1 and the SIM 140-2 may be separate information cards, or may be integrated into an identical information card. The SIM 140-1 and the SIM 140-2 may be included in an Embedded SIM (eSIM).

The SIM 140-1 is managed by the first communication operator. The SIM 140-2 is managed by the second communication operator. Note that the SIM 140-1 and the SIM 140-2 may be managed by the identical communication operator.

In a case of using the SIM 140-1 to register with the first mobile network 40-1, the UE 100 can utilize the mobile communication service provided by the first communication operator via the first mobile network 40-1. In a case of using the SIM 140-2 to register with the second mobile network 40-2, the UE 100 can utilize the mobile communication service provided by the second communication operator via the second mobile network 40-2.

The user of the UE 100 may configure the priorities of SIM 140-1 and SIM 140-2 via the user interface 150. The user may configure the priorities such that the SIM 140-1 is prioritized over the SIM 140-2 or that the SIM 140-2 is prioritized over the SIM 140-1.

Figure 3:
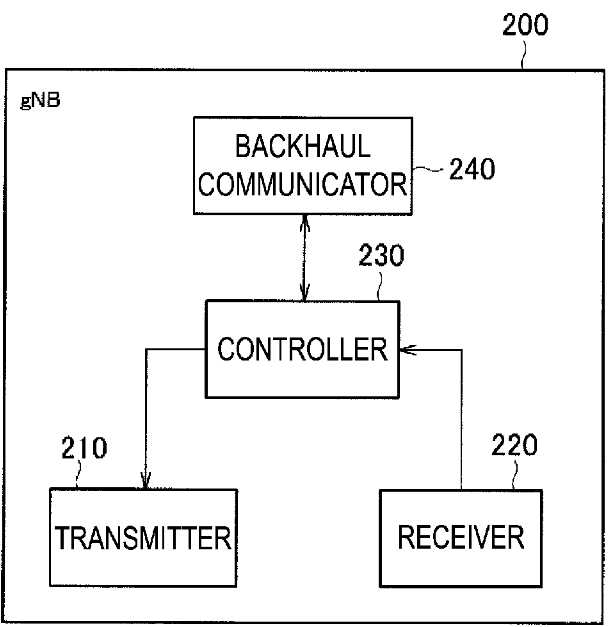
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory electrically connected to the processor. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between the base station and the core network.

Figure 4:
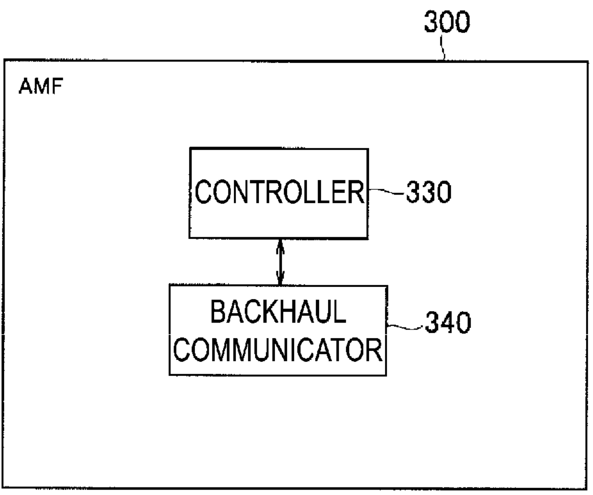
FIG. 4 is a diagram illustrating a configuration of a core network apparatus according to an embodiment.

FIG. 4 is a diagram illustrating a configuration of an AMF 300 (core network apparatus).

As illustrated in FIG. 4, the AMF 300 includes a controller 330 and a backhaul communicator 340.

The controller 330 performs various types of control in the AMF 300. The controller 330 includes at least one processor and at least one memory electrically connected to the processor. The memory stores a program to be executed by the processor and information to be used for processing by the processor.

The backhaul communicator 340 is connected to the gNB 200 via the interface between the base station and the core network.

Figure 5:
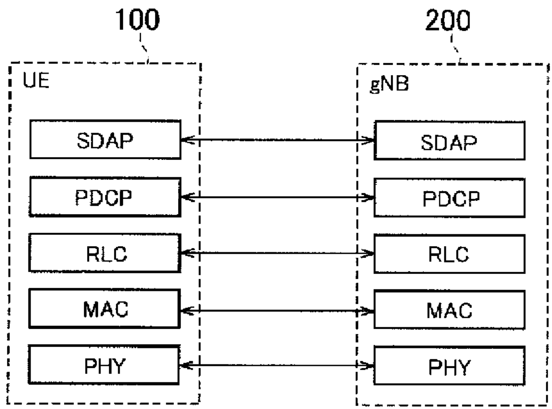
FIG. 5 is a diagram illustrating a configuration of a radio interface protocol stack in a user plane according to an embodiment.

FIG. 5 is a diagram illustrating a configuration of a protocol stack of a radio interface in a user plane handling data.

As illustrated in FIG. 5, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

In the PHY layer, a frame structure is used that includes radio frames, subframes, slots, and symbols. The radio frame includes 10 subframes on a time axis. Each subframe has a length of 1 ms. Each subframe includes a plurality of slots. Each slot includes a plurality of symbols. Each subframe includes a plurality of resource blocks (RBs) on a frequency axis. Each resource block includes a plurality of subcarriers on the frequency axis. Among the radio resources (time and frequency resources) allocated to the UE 100, frequency resources can be identified by resource blocks, and time resources can be identified by subframes (or slots or symbols).

In a downlink, a section of first several symbols of each subframe is a region used as a Physical Downlink Control Channel (PDCCH) for mainly transmitting downlink control information. The remaining portion of each subframe is a region that can be used as a Physical Downlink Shared Channel (PDSCH) for mainly transmitting downlink data.

The MAC layer performs preferential control of data, retransmission processing using a hybrid ARQ (HARM), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow being a unit for a core network to perform QoS control and a radio bearer being a unit for an access stratum (AS) to perform QoS control. Note that, when the RAN is connected to the EPC, the SDAP may not be provided.

Figure 6:
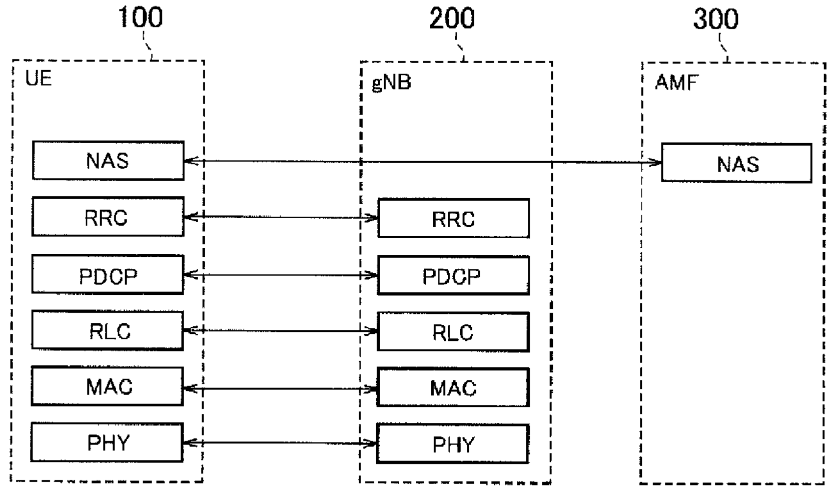
FIG. 6 is a diagram illustrating a configuration of a protocol stack of a radio interface in a control plane handling signaling (control signals) according to an embodiment.

FIG. 6 is a diagram illustrating a configuration of a protocol stack of a radio interface in a control plane handling signaling (control signal).

As illustrated in FIG. 6, the protocol stack of the radio interface of the control plane includes a Radio Resource Control (RRC) layer and a Non-Access Stratum (NAS) layer instead of the SDAP layer illustrated in FIG. 5.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the RRC connection is interrupted (suspended), the UE 100 is in an RRC inactive state.

The NAS layer located in a layer higher than the RRC layer performs session management, mobility management, and the like. NAS signaling is transmitted between the NAS layer of the UE 100 and the NAS layer of the AMF 300.

Note that the UE 100 includes an application layer other than the protocol of the radio interface.

First Embodiment

A first embodiment is described based on the assumption of the system configuration as described above.

When the communication of the UE 100 in the MN 40-1 and the communication of the UE 100 in the MN 40-2 at the same time are scheduled, one of the communications may not be performed due to the capability of the UE 100. For example, when both MNs 40 schedule downlink communications at the same timing at different frequencies for the UE 100, the UE 100 having only a single radio reception device (receiver 110) cannot perform one of both downlink communications. When one of the downlink communications uses large amount of resources of the CPU of the UE 100, even the UE 100 including a plurality of radio reception devices cannot perform the other of the downlink communications. It is preferable that the UE 100 does not cause both communications to collide with each other. The first embodiment is an embodiment for solving such a problem.

In the first embodiment, the UE 100 transmits, to the NW 40-1, timing information for identifying an execution timing which is a timing for performing communication in the NW 40-2. This allows the NW 40-1 to recognize the timing at which the UE 100 performs the communication in the NW 40-2 and schedule a communication with the UE 100 at a timing not overlapping the former timing. Thus, a collision between the communication in the NW 40-1 and the communication in the NW 40-2 can be avoided.

The execution timing includes at least one of a paging reception occasion, a unicast scheduling occasion, an MBS scheduling occasion, and a sidelink scheduling occasion.

Paging Reception Occasion

The paging reception occasion is the timing at which the UE 100 in the RRC idle state or the RRC inactive state monitors paging from the NW 40-2.

The UE 100 in the RRC idle state monitors CN paging. The UE 100 in the RRC inactive state monitors CN paging and RAN paging. The CN paging is paging initiated by the core network (CN). The RAN paging is paging initiated by the RAN.

The UE 100 in the RRC idle state and the RRC inactive state monitors the paging using discontinuous reception (DRX) to reduce power consumption.

The UE 100 monitors one paging occasion (PO) per DRX cycle. The DRX cycle is represented by the number of radio frames. The DRX cycle may be referred to as a paging cycle. The PO includes one or more subframes or one or more symbols. One PO is associated with a paging frame (PF) that is one radio frame. The PO associated with the PF may start within the PF or after the PF.

The paging reception occasion for the UE 100 is a timing (subframe or symbol) included in the PO generated per DRX cycle.

The UE 100 determines that any smaller one of a default DRX cycle and a UE-specific DRX cycle configured for the UE 100 is the DRX cycle (referred to as "T" below) to be used by the UE 100 for monitoring paging.

The default DRX cycle is included in the system information received from a serving cell (gNB 200) in which the UE 100 exists.

The UE-specific DRX cycle is differentiated depending on the RRC state of the UE 100. When the UE 100 is in the RRC idle state, the UE-specific DRX cycle includes a first UE-specific DRX cycle. When the UE 100 is in the RRC inactive state, the UE-specific DRX cycle includes the first UE-specific DRX cycle and a second UE-specific DRX cycle.

The first UE-specific DRX cycle is a UE-specific DRX cycle configured for the UE 100 by a NAS message to monitor the CN paging. Such a NAS message is, for example, a REGISTER ACCESS message from the AMF 300-2 in the NW 40-2 when the UE 100 registers with the NW 40-2.

The second UE-specific DRX cycle is a UE-specific DRX cycle configured for the UE 100 by a dedicated RRC message to monitor the RAN paging. Such a dedicated RRC message is, for example, an RRCrelease message for causing the UE 100 to transition from the RRC connected state to the RRC inactive state. Such an RRCrelease message includes a "SuspendConfig" information element (IE), and "SuspendConfig" includes information indicating the second UE-specific DRX cycle.

The UE 100 in the RRC idle state determines any smaller one of the default DRX cycles and the first UE-specific DRX cycle as "T".

The UE 100 in the RRC inactive state determines any smaller one of the default DRX cycles, the first UE-specific DRX cycle, and the second UE-specific DRX cycle as "T".

Note that when the UE-specific DRX cycle is not configured, the UE 100 determines the default DRX cycle as "T".

After determining "T", the UE 100 determines the radio frame number of the PF and the subframe or symbol included in the PO, based on "T", "UE_ID", and paging-related information.

Here, "UE_ID" represents a value calculated by a temporary subscriber identifier assigned to the UE 100 by the AMF 300-2. For example, such a temporary subscriber identifier is a 5G-S-Temporary Mobile Subscriber Identity (TMSI). For example, "UE_ID" has a value obtained by "5G-S-TMSI mod 1024."

The paging-related information is included in the system information received from the serving cell (gNB 200) in which the UE 100 exists. The paging-related information includes parameters such as N, Ns, and PF_offset.

Note that for details of the determination method of T, the PF, and the PO described above, see the 3GPP technical specification TS38.304, for example. Note that for details of the determination method when the UE 100 exists in an LTE cell, see the 3GPP technical specification TS36.304, for example.

Unicast Scheduling Occasion

The unicast scheduling occasion is a candidate timing at which unicast data transmission/reception between the UE 100 in the RRC connected state and the NW 40-2 (gNB 200-2) is scheduled.

The unicast scheduling occasion is a timing included in a scheduling period generated in a cycle.

Figure 7:
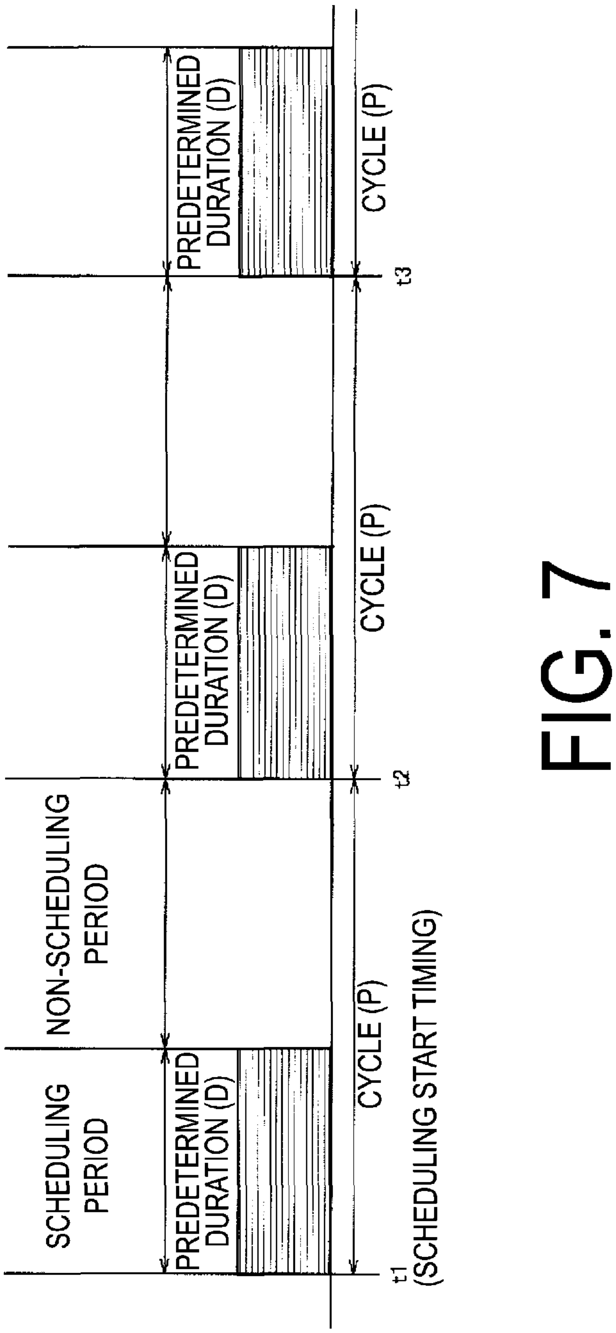
FIG. 7 is a diagram illustrating an example of a unicast scheduling occasion according to a first embodiment.

FIG. 7 is a diagram illustrating an example of the unicast scheduling occasion.

As illustrated in FIG. 7, the schedule period is a period generated per cycle "P". The scheduling period starts from a start timing (t1, t2, t3 . . . ). The scheduling period has a predetermined duration (D).

The gNB 200 assigns a communication timing (subframe, slot, symbol, or the like) of unicast data with the UE 100 in a scheduling period within one cycle. On the other hand, the gNB 200 does not assign a communication timing to the UE 100 in a non-scheduling period (a period that is not a scheduling period) in one cycle. The communication timing includes at least one of a timing at which the UE 100 transmits the unicast data to the gNB 200 and a timing at which the gNB 200 transmits the unicast data to the UE 100.

The unicast scheduling occasion is identified by three parameters of the start timing, the cycle, and the predetermined duration.

The start timing may be represented by a radio frame number and a subframe number, or may be represented by a slot number or a symbol number in addition to the radio frame number and the subframe number. The cycle is represented by the number of radio frames, the number of subframes, or the number of slots. The predetermined duration is represented by the number of subframes, the number of slots, or the number of symbols.

The unicast scheduling occasion is configured for the UE 100 from the gNB 200 in a unicast RRC message (e.g., RRCreconfiguration message). The gNB 200 may configure the unicast scheduling occasion for the UE 100 in response to a request from the UE 100. The gNB 200 may configure the unicast scheduling occasion for the UE 100 based on past traffic history of the UE 100 and/or future traffic prediction of the UE 100 and/or the like.

The scheduling period generated per cycle may include a plurality of discontinuous timings. For example, the scheduling period may include a plurality of discontinuous timings within a predetermined duration (D). In this case, the plurality of discontinuous timings within the predetermined duration are represented by a bitmap. For example, when the predetermined duration corresponds to four subframes and the first subframe and the fourth subframe of the fourth subframes are timings corresponding to the scheduling periods, the scheduling periods are identified by a bitmap of (1, 0, 0, 1) and the predetermined duration.

MBS Scheduling Occasion

The MBS scheduling occasion is a candidate timing at which MBS data transmission from the NW 40-2 to the UE 100 is scheduled. The MBS is a service that performs data transmission from the NW 40-2 to the UE 100 in broadcast or multicast mode, in other words, point-to-multipoint (PTM) mode. The MBS may be referred to as a Multimedia Broadcast and Multicast Service (MBMS). The MBS data refers to data transmitted by the MBS.

The MBS scheduling occasion is a timing included in a scheduling period generated in a cycle.

The MBS scheduling occasion may be identified by the parameters such as the start timing, the cycle, the predetermined duration, and the bitmap, the same as and/or similar to the unicast scheduling occasion described above. Here, the parameters for identifying the MBS scheduling occasion are different from the parameters for identifying the unicast scheduling occasion.

The MBS scheduling occasion is configured for the UE 100 from the gNB 200 via a broadcast RRC message (e.g., MBS SIB). The MBS scheduling occasion may be configured for the UE 100 regardless of the RRC state of the UE 100.

When the UE 100 is interested in receiving the MBS data regardless of the RRC state of the UE 100, the UE 100 acquires the MBS SIB and identifies the MBS scheduling occasion based on MBS information included in the MBS SIB. The MBS information may directly include parameters for identifying the MBS scheduling occasion. The MBS information may include MBS control channel configuration information for the UE 100 to receive MBS control channel on which the parameters for identifying the MBS scheduling occasion are carried.

Sidelink Scheduling Occasion

The sidelink scheduling occasion is a candidate timing at which sidelink communication is scheduled in the NW 40-2 by the UE 100. The sidelink communication is communication performed between nearby UEs 100 without being through a network node (e.g., gNB 200). The sidelink communication includes at least one of sidelink transmission in which the UE 100 transmits data to another UE 100 and sidelink reception in which the UE 100 receives data from another UE 100.

The sidelink scheduling occasion is a timing included in a scheduling period generated in a cycle.

The sidelink scheduling occasion may be identified by the parameters such as the start timing, the cycle, the predetermined duration, and the bitmap, same as or similar to the unicast scheduling occasion described above. Here, the parameters for identifying the sidelink scheduling occasion are different from the parameters for identifying the unicast scheduling occasion. The parameters for identifying the sidelink scheduling occasion are different from the parameters for identifying the MBS scheduling occasion.

The sidelink scheduling occasion may be configured for the UE 100 from the gNB 200 via a broadcast RRC message (e.g., sidelink SIB). The sidelink scheduling occasion may be configured for the UE 100 regardless of the RRC state of the UE 100.

When the UE 100 is interested in the sidelink communication regardless of the RRC state of the UE 100, the UE 100 acquires the sidelink SIB and identifies the sidelink scheduling occasion based on sidelink information included in the sidelink SIB. The sidelink information is, for example, information indicating a resource pool for the sidelink communication.

Operation Example 1 of First Embodiment

Figure 8:
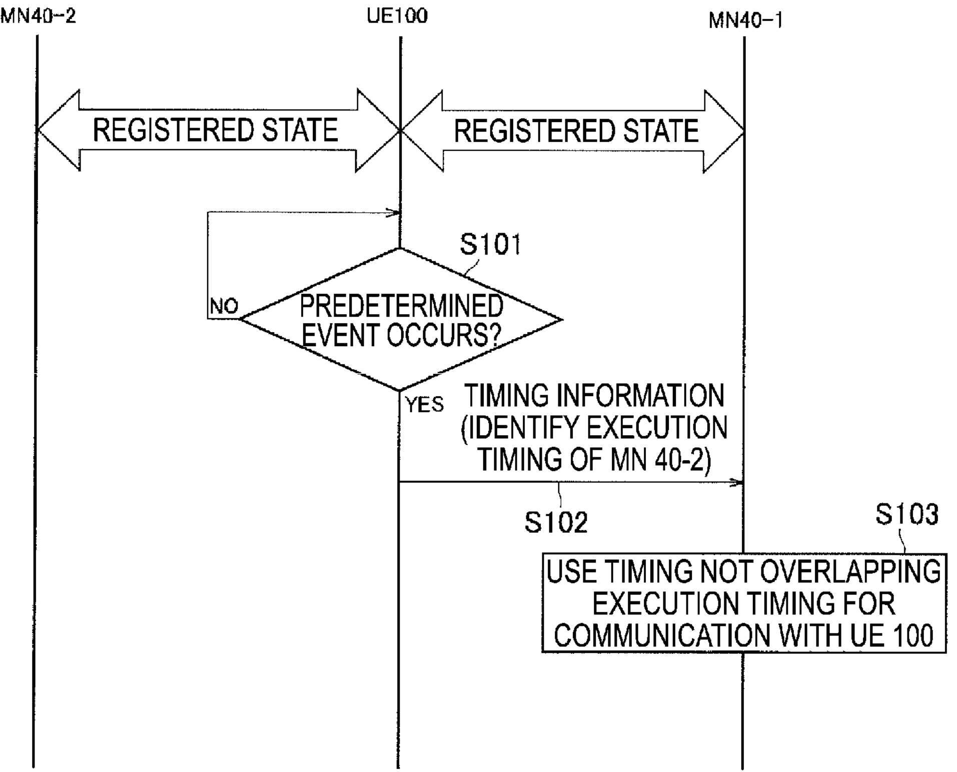
FIG. 8 is a diagram illustrating operations of Operation Example 1 according to the first embodiment.

FIG. 8 is a diagram illustrating operations of Operation Example 1 according to the first embodiment.

As illustrated in FIG. 8, in an initial state of Operation Example 1, the UE 100 registers with both the MN 40-2 and the MN 40-1. In the initial state, the UE 100 is in an RRC state being any of the RRC connected state, the RRC idle state, and the RRC inactive state in the MN 40-2. The UE 100 is in an RRC state being any of the RRC connected state, the RRC idle state, and the RRC inactive state in the MN 40-1.

In step S101, the UE 100 determines whether a predetermined event occurs. The predetermined event is described in detail below. When the UE 100 determines that the predetermined event occurs (step S101: YES), the UE 100 advances the processing to step S102.

In step S102, the UE 100 transmits, to the NW 40-1, the timing information for identifying the execution timing which is a timing for performing communication in the NW 40-2. The timing information includes at least one of information for identifying the paging reception occasion, information for identifying the unicast scheduling occasion, information for identifying the MBS scheduling occasion, and information for identifying the sidelink scheduling occasion.

In step S102, when the UE 100 is in the RRC idle state or the RRC inactive state in the NW 40-1, the UE 100 may transition to the RRC connected state and then transmit the timing information.

In step S102, a transmission destination of the timing information is the gNB 200-1 and/or the AMF 300-1 in the NW 40-1. When the transmission destination of the timing information is the gNB 200-1, the timing information is transmitted in the RRC message. When the transmission destination of the timing information is the AMF 300-1, the timing information is transmitted in the NAS message.

When the UE 100 prefers to transition from the RRC connected state to the RRC idle state in the MN 40-1, the UE 100 may determine the transmission destination of the timing information as the AMF 300-1. In this case, the UE 100 may transmit, to the gNB 200-1, information indicating that the UE 100 prefers to transition to the RRC idle state after step S102. When the UE 100 prefers to transition from the RRC connected state to the RRC inactive state in the MN 40-1, the UE 100 may determine the transmission destination of the timing information as both the AMF 300-1 and the gNB 200-1. In this case, the UE 100 may transmit, to the gNB 200-1, information indicating that the UE 100 prefers to transition to the RRC inactive state after step S102.

When the UE 100 transmits the timing information in the NAS message, the NAS layer of the UE 100 generates the timing information. In this case, the RRC layer transmits, to the NAS layer of the UE 100, information required for identifying the execution timing. The required information includes, for example, the above-described second UE-specific DRX cycle and default DRX cycle that the RRC layer recognizes.

The UE 100 may transmit the timing information together with information indicating guard time. The guard time is time required by the UE 100 to switch from communication with the NW 40-2 (gNB 200-2) to communication with the NW 40-1 (gNB 200-1). The guard time is represented by the number of radio frames, the number of subframes, the number of slots, or the number of symbols. The guard time may be provided before and after the execution timing (e.g., PO).

When the timing between the NW 40-1 (gNB 200-1) and the NW 40-2 (gNB 200-2) is asynchronous, the timing information transmitted to NW 40-1 may include information for identifying the timing of the NW 40-1 (radio frame number, subframe number, slot number, symbol number, etc.) corresponding to the execution timing of the NW 40-2. In this case, the timing information may be information indicating the timing of the NW 40-1 (i.e., the radio frame number, subframe number, slot number, symbol number, or the like of the NW 40-1) corresponding to the execution timing of the NW 40-2. The timing information may include information indicating the execution timing of the NW 40-2, and information indicating a difference between the timings of the NW 40-1 (gNB 200-1) and the NW 40-2 (gNB 200-2). The difference between the timings is represented by the number of radio frames, the number of subframes, the number of slots, the number of symbols. and the like.

In step S103, the MN 40-1 (gNB 200-1 and/or AMF 300-1) communicates with the UE 100 without using the timing identified by the information received in step S102 (timing information, or timing information and information indicating the guard time). Hereinafter, the timing identified by the information received in step S102 (timing information, information indicating the guard time) is referred to as "non-use timing".

The operation in step S103 includes, for example, the following operations 1 to 4.

Operation 1: When the gNB 200-1 causes the UE 100 to transition to the RRC inactive state, the gNB 200-1 configures the UE-specific DRX cycle of the UE 100 (the second UE-specific DRX cycle described above), so that the PO corresponding to the RAN paging transmitted from the gNB 200-1 is arranged at the non-use timing, and transmits the RRCrelease message including the UE-specific DRX cycle to the UE 100.

Operation 2: The gNB 200-1 assigns a timing other than the non-use timing to the transmission/reception of data to/from the UE 100 in the RRC connected state.

Operation 3: The gNB 200-1 configures a predetermined period of time including the non-use timing as a communication gap of the UE 100 in the RRC connected state, and transmits information indicating the communication gap to the UE 100. The gNB 200-1 does not schedule the transmission/reception of data to/from the UE 100 in the communication gap.

Operation 4: The AMF 300-1 configures the UE-specific DRX cycle of the UE 100 (the first UE-specific DRX cycle described above) and a new 5G-S-TMSI assigned to the UE 100, so that the PO corresponding to the CN paging transmitted from the AMF 300-1 is arranged at the non-use timing, and notifies them to the UE 100 in the NAS message. Alternatively, the AMF 300-1 may notify the UE 100 of an offset value for the 5G-S-TMSI already assigned to the UE 100 instead of assigning the new 5G-S-TMSI to the UE 100. The offset value is only used to identify paging reception occasion. The offset value may be notified from the AMF 300-1 to the gNB 200-1 during the paging execution.

Note that the operation in step S103 is optional.

The predetermined event is described. The predetermined event includes any of the following events A to F.

The event A is an event that causes the UE 100 to start monitoring a paging message in the NW 40-2.

When the event A occurs in the UE 100 in step S101, the UE 100, in step S102, transmits the timing information including information indicating the paging reception occasion. The timing information may further include information for identifying another execution timing that the UE 100 recognizes at this time (unicast scheduling occasion, MBS scheduling occasion, and sidelink scheduling occasion).

The event A includes, for example, any of the following events A1 to A3.

The event A1 indicates that the UE 100 transitions from the RRC connected state to the RRC inactive state in the NW 40-2.

The event A2 indicates that the UE 100 transitions from the RRC connected state to the RRC idle state in the NW 40-2.

The Event B is an event that may cause the paging reception occasion to change in the UE 100 that already starts monitoring the paging message in the NW 40-2.

When the event B occurs in the UE 100 in step S101, the UE 100, in step S102, transmits the timing information including information indicating the paging reception occasion (updated paging reception occasion). The timing information may further include information for identifying another execution timing that the UE 100 recognizes at this time.

The event B is, for example, any of the following events B1 to B3.

The event B1 indicates that the UE 100 in the RRC inactive state transitions to the RRC idle in the NW 40-2. In this case, the UE 100 determines "T" without taking into account the second UE-specific DRX cycle, so "T" may change.

The event B2 indicates that the RRC inactive state is maintained after the UE 100 in the RRC inactive state in the NW 40-2 performs a Ran Notification Area (RNA) update procedure. In this case, the UE 100 again receives the RRCRelease message including "suspendConfig", and thus the second UE-specific DRX cycle may be updated and "T" may change. For details of the RNA update procedure, see the 3GPP technology specification TS38.300, chapter 9.2.2.5.

The event B3 indicates that the UE 100 in the RRC inactive state or the RRC idle state in the NW 40-2 performs cell reselection. In this case, the default DRX cycle may be changed in response to changing the serving cell of the UE 100, and thus "T" may change.

The event C indicates that the unicast scheduling occasion is configured for the UE 100 in the NW 40-2, or the unicast scheduling occasion for the UE 100 is changed in the NW 40-2.

When the event C occurs in the UE 100 in step S101, the UE 100, in step S102, transmits the timing information including the information for identifying the unicast scheduling occasion. The timing information may further include information for identifying another execution timing that the UE 100 recognizes at this time.

The event D indicates that the UE 100 is interested in receiving the MBS data in the NW 40-2, that the UE 100 starts receiving the MBS data in the NW 40-2, or that the MBS scheduling occasion of the UE 100 is changed in the NW 40-2.

When the event D occurs in the UE 100 in step S101, the UE 100, in step S102, transmits the timing information including the information for identifying the MBS scheduling occasion. The timing information may further include information for identifying another execution timing that the UE 100 recognizes at this time.

The event E indicates that the UE 100 is interested in the sidelink communication in the NW 40-2, that the UE 100 starts the sidelink communication in the NW 40-2, or that the sidelink scheduling occasion of the UE 100 is changed in the NW 40-2.

When the event E occurs in the UE 100 in step S101, the UE 100, in step S102, transmits the timing information including the information for identifying the sidelink scheduling occasion. The timing information may further include information for identifying another execution timing that the UE 100 recognizes at this time.

The event F indicates that the UE 100 transitions to the RRC connected state in the NW 40-1.

When the event F occurs in the UE 100 in step S101, the UE 100, in step S102, transmits the timing information including the information for identifying the execution timing that the UE 100 already recognizes at the time when the event F occurs. For example, when the UE 100 already monitors the paging in the NW 40-2 and receives the MBS data at the time when the event F occurs, the UE 100 transmits the timing information including the information for identifying the paging reception occasion and the information for identifying the MBS scheduling occasion.

Operation Example 2 of First Embodiment

Differences of Operation Example 2 from Operation Example 1 is mainly described. The Operation Example 2 is an operation example related to permission to transmit the timing information.

Figure 9:
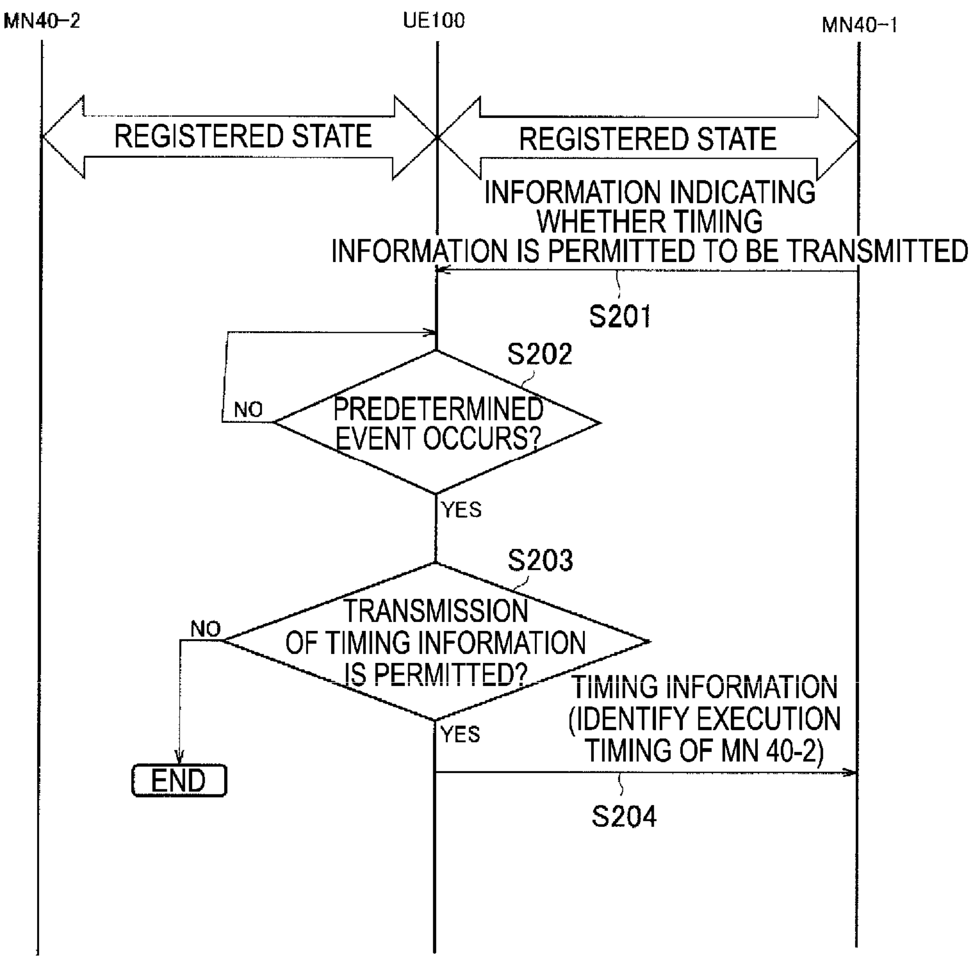
FIG. 9 is a diagram illustrating operations of Operation Example 2 according to the first embodiment.

FIG. 9 is a diagram illustrating operations of Operation Example 2 according to the first embodiment.

In step S201, the UE 100 receives, from the NW 40-1 (gNB 200-1), information indicating whether the timing information is permitted to be transmitted (hereinafter referred to as "transmittability information"). The UE 100 may receive the transmittability information in the dedicated RRC message, or may receive the transmittability information in the SIB. The UE 100 stores the transmittability information received.

Prior to step S201, the UE 100 may transmit a request message for permitting transmission of the timing information to the gNB 200-1. The gNB 200-1 transmits the transmittability information in the dedicated RRC message to the UE 100 in response to receiving the request message. The request message may include information indicating that the UE 100 is in a state of registering with both the MN 40-1 and the MN 40-2 (hereinafter referred to as a "MUSIM state"). When the UE 100 is in the MUSIM state, the gNB 200-1 may transmit, to the UE 100, the transmittability information indicating that the timing information is permitted to be transmitted. In the current LTE specification, the handling of the UE 100 having a plurality of SIMS is not defined, and thus when the NW 40-1 uses the LTE technology (i.e., the NW 40-1 has the E-UTRAN and the EPC), the timing information may not be permitted to be transmitted.

In step S202, the UE 100 determines whether the predetermined event occurs. The predetermined event occurs. When the UE 100 determines that the predetermined event occurs (step S202: YES), the UE 100 advances the processing to step S203.

In step S203, the UE 100 determines whether the timing information is permitted to be transmitted based on the stored transmittability information. When the UE 100 determines that the timing information is not permitted to be transmitted (step S202: NO), the UE 100 ends the flow. When the UE determines that the timing information is permitted to be transmitted (step S203: YES), the UE 100 advances the processing to step S204.

The operation in step S204 is the same as or similar to the operation in step S102.

Operation Example 3 of First Embodiment

Differences of Operation Example 3 from Operation Example 1 is mainly described. Operation Example 3 is an operation example related to a priority network.

In Operation Example 3, when the UE 100 registers with both the MN 40-1 and the MN 40-2, the UE 100 determines that one MN 40 is a priority network and determine that the other MN 40 is a non-priority network.

The UE 100 performs communication in the priority network (such as paging monitoring, and transmission/reception of data) more preferentially than communication in the non-priority network. For example, when the communication in the priority network and the communication in the non-priority network are scheduled in the same timing, the UE 100 may perform the communication in the priority network and not perform the communication in the non-priority network. When the UE 100 receives the data transmitted by the priority network and the data transmitted by the non-priority network at the same timing, the UE 100 may discard the data transmitted by the non-priority network. Accordingly, the non-priority network on scheduling the communication with the UE 100 needs to take into account the execution timing of the UE 100 in the priority network in order to succeed the communication.

A determination method of the priority network is described. The determination method includes, for example, any of first to fourth methods below.

In the first method, the UE 100 determines the priority network based on user configuration. For example, when the user configures to prioritize the SIM 140-2 over the SIM 140-1, the UE 100 determines that the MN 40-2 corresponding to the SIM 140-2 is a priority network, and determines that the MN 40-1 corresponding to the SIM 140-1 is a non-priority network.

In the second method, the UE 100 determines that the MN 40 using the LTE technology is a priority network. For example, when the MN 40-1 uses the 5G technology, and the MN 40-2 uses the LTE technology, the UE 100 determines that the MN 40-2 is a priority network and determines that the MN 40-1 is a non-priority network. Note that when the MN 40-1 and the MN 40-2 use the same technology, the UE 100 does not determine the priority network by the second method.

In the third method, the UE 100 determines, as a priority network, the MN 40 in which a radio bearer having a priority equal to or greater than a threshold is established. For example, when a radio bearer having a priority equal to or greater than a threshold is established between the MN 40-2 and the UE 100, the UE 100 determines that the MN 40-2 is a priority network, and determines that the MN 40-1 is a non-priority network.

The priority of the radio bearer is determined by the type of traffic of the user data mapped to the radio bearer. For example, when the type of traffic is voice call, the priority is determined to be high, or when the type of the traffic is a mail, a chat, web browsing or the like, the priority is determined to be low. The priority of the radio bearer may be a value associated with a 5 QI. For the correspondence between the 5 QI and the priority, see the 3GPP Technical Specification TS 23.501, Table 5.7.4. The priority of the radio bearer may be a value associated with the QCI. For the correspondence between the QCI and the priority, see the 3GPP Technical Specification TS 23.203, Table 6.1.7.

In the fourth method, the UE 100 determines that the MN 40 configuring a periodic communicable period for the UE 100 is a priority network. The periodic communicable period is, for example, a communication period identified by the Semi-Persistent Scheduling (SPS), or a communication period identified by a Configured Grant (CG). For example, when the MN 40-2 configures the SPS for the UE 100, the UE 100 determines that the MN 40-2 is a priority network and determines that the MN 40-1 is a non-priority network.

Figure 10:
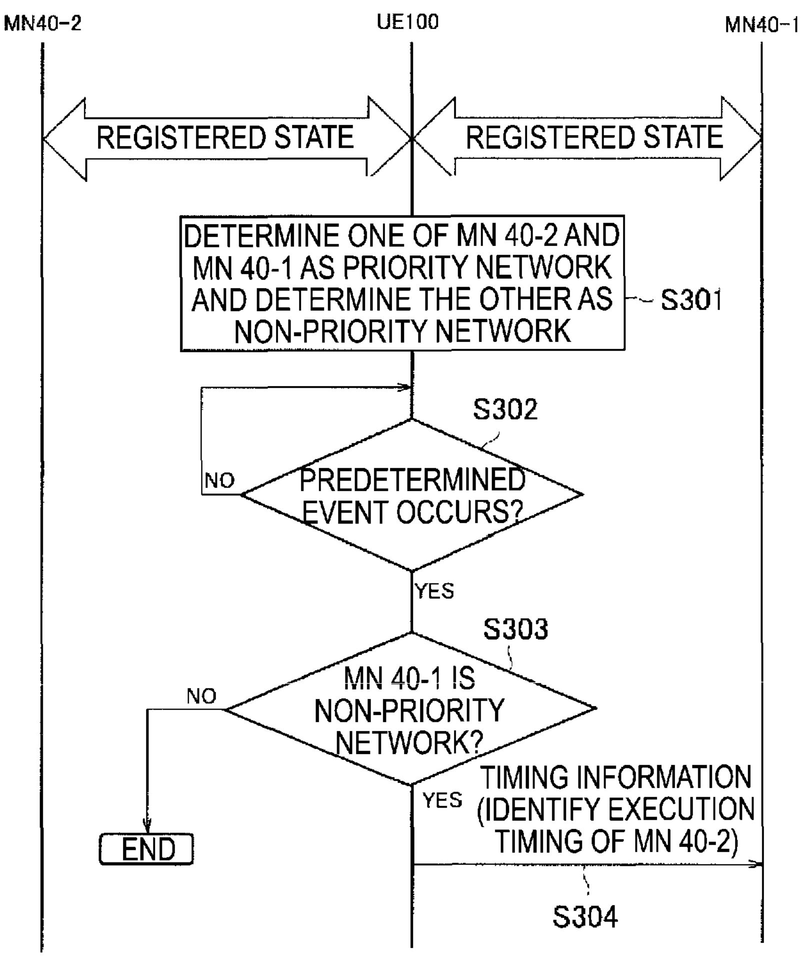
FIG. 10 is a diagram illustrating operations of Operation Example 3 according to the first embodiment.

Operation Example 3 is described using FIG. 10.

FIG. 10 is a diagram illustrating operations of Operation Example 3 according to the first embodiment.

In step S301, the UE 100 uses the determination method of the priority network described above to determine that one of the MN 40-2 and the MN 40-1 is a priority network, and determines that the other is a non-priority network.

In step S302, the UE 100 determines whether the predetermined event occurs. The predetermined event occurs. When the UE 100 determines that the predetermined event occurs (step S302: YES), the UE 100 advances the processing to step S303.

In step S303, the UE 100 determines whether the MN 40-1 is a non-priority network. When the UE 100 determines that the MN 40-1 is not a non-priority network (step S303: NO), the UE 100 ends the flow. When the UE 100 determines that the MN 40-1 is a non-priority network (step S303: YES), the UE 100 advances the processing to step S304.

The operation in step S304 is the same as or similar to the operation in step S102.

In Operation Example 3, after step S301, the UE 100 may transmit, to the NW 40 determined to be a non-priority network, a non-priority notification indicating that the NW 40 is a non-priority network. For example, when the UE 100 determines that the NW 40-1 is a non-priority network, the UE 100 transmits the non-priority notification to the NW 40-1 (gNB 200-1 and/or the AMF 300-1). The UE 100 configured with the periodic communicable period in the NW 40-2 may transmit the information for identifying the periodic communicable period together with the non-priority notification.

The gNB 200-1 receiving the non-priority notification recognizes that the NW 40-1 is a non-priority network. When the NW 40-1 recognizes that the NW 40-1 is a non-priority network, the gNB 200-1 may restrict the establishment of the radio bearer having the priority equal to or greater than the threshold (e.g., radio bearer for voice call) with the UE 100.

In Operation Example 3, when the UE 100 determines that the NW 40-1 is not a non-priority network after transmitting the non-priority notification to the NW 40-1, the UE 100 may notify the NW 40-1 of such determination. In this case, the restriction on the establishment of the radio bearer having the priority equal to or greater than the threshold is released.

In Operation Example 3, the UE 100 may transmit, to the NW 40 determined to be a non-priority network, information indicating that the UE prefers to transition to the RRC idle state or the RRC inactive state. Such information is information indicating that a preferred RRC-State of the UE 100 is the RRC idle state, for example. Such information may be information indicating that the preferred RRC-State of the UE 100 is the RRC inactive state. Such information may be information indicating that the UE 100 simply prefers to release the RRC connection and has no preferred RRC-State.

For example, when the UE 100 determines the NW 40-1 as a non-priority network and is in the RRC connected state in the NW 40-1, the UE 100 transmits, to the gNB 200-1, the information indicating that the UE prefers to transition to the RRC idle state or the RRC inactive state. The information may be transmitted together with the timing information. The gNB 200-1 may cause the UE 100 to transition to the RRC idle state or the RRC inactive state in response to the reception of the information.

Operation Example 4 of First Embodiment

Differences of Operation Example 4 from Operation Example 1 is mainly described. Operation Example 4 is an operation example related to UE context.

Figure 11:
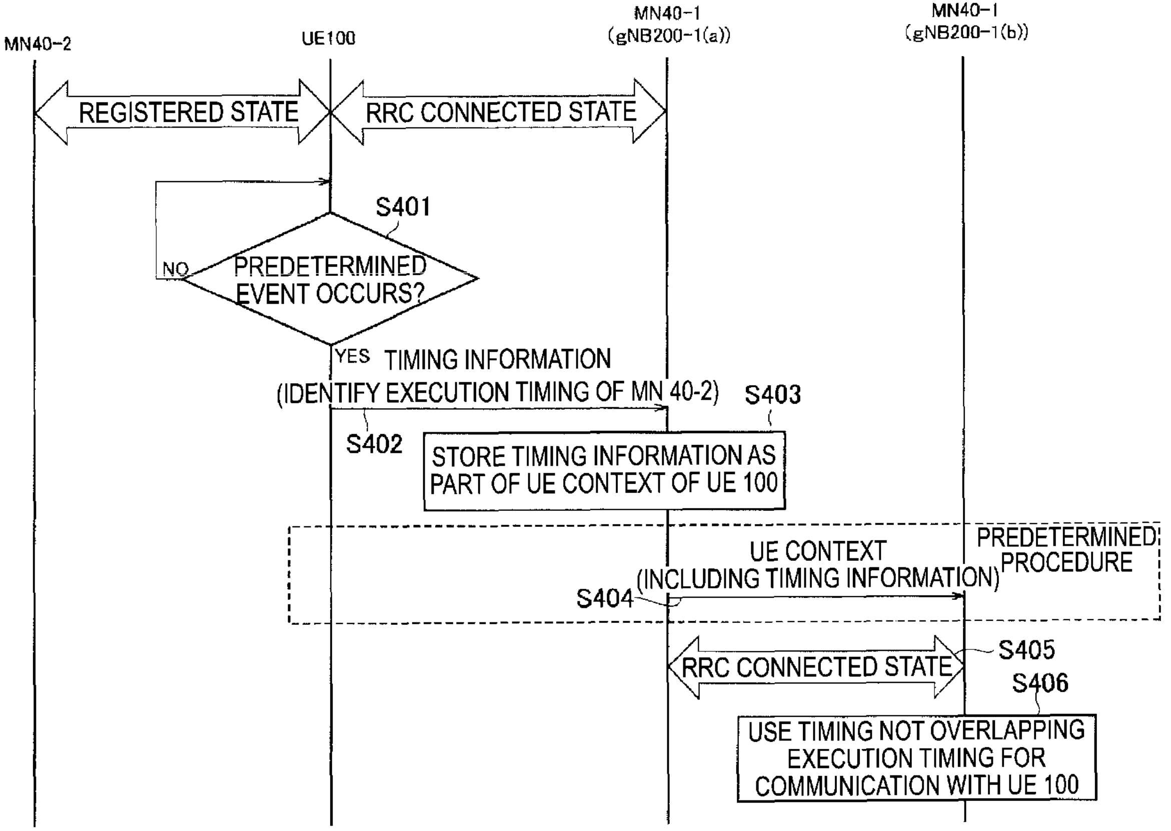
FIG. 11 is a diagram illustrating operations of Operation Example 4 according to the first embodiment.

FIG. 11 is a diagram illustrating operations of Operation Example 4. As illustrated in FIG. 11, in an initial state, the UE 100 registers with the MN 40-2. The UE 100 has an RRC connection with a gNB 200-1(*a*) belonging to the MN 40-1.

The operation in step S401 is the same as or similar to the operation in step S101.

In step S402, the UE 100 transmits the timing information to the gNB 200-1(*a*) belonging to the MN 40-1.

In step S403, the gNB 200-1(*a*) stores the timing information as part of the UE context of the UE 100.

In step S404, the gNB 200-1(*a*) transmits the UE context including the timing information in a predetermined procedure for establishing an RRC connection between the gNB 200-1(*b*) belonging to the MN 40-1 and the UE 100.

Examples of the predetermined procedure include a handover procedure, an RRC connection re-establishment procedure, and an RRC connection resume procedure.

For example, the gNB 200-1(*a*) transmits a Handover-PreparationInformation message in the handover procedure including the UE context (including the timing information).

In the RRC Resume procedure, the gNB 200-1(*a*) may transmit the UE context to the gNB 200-1(*b*) in response to receiving a RETRIEVE UE CONTEXT REQUEST message for requesting for provision of the UE context from the gNB 200-1(*b*).

After the predetermined procedure is completed, in step S405, the RRC connection between the UE 100 and the gNB 200-1(*b*) is established.

In step S406, the gNB 200-1(*b*) communicates with the UE 100 without using the timing identified by the timing information (the operations 1 to 3 in step S103 described above).

Second Embodiment

A second embodiment is an operation example related to voice communication.

Figure 12:
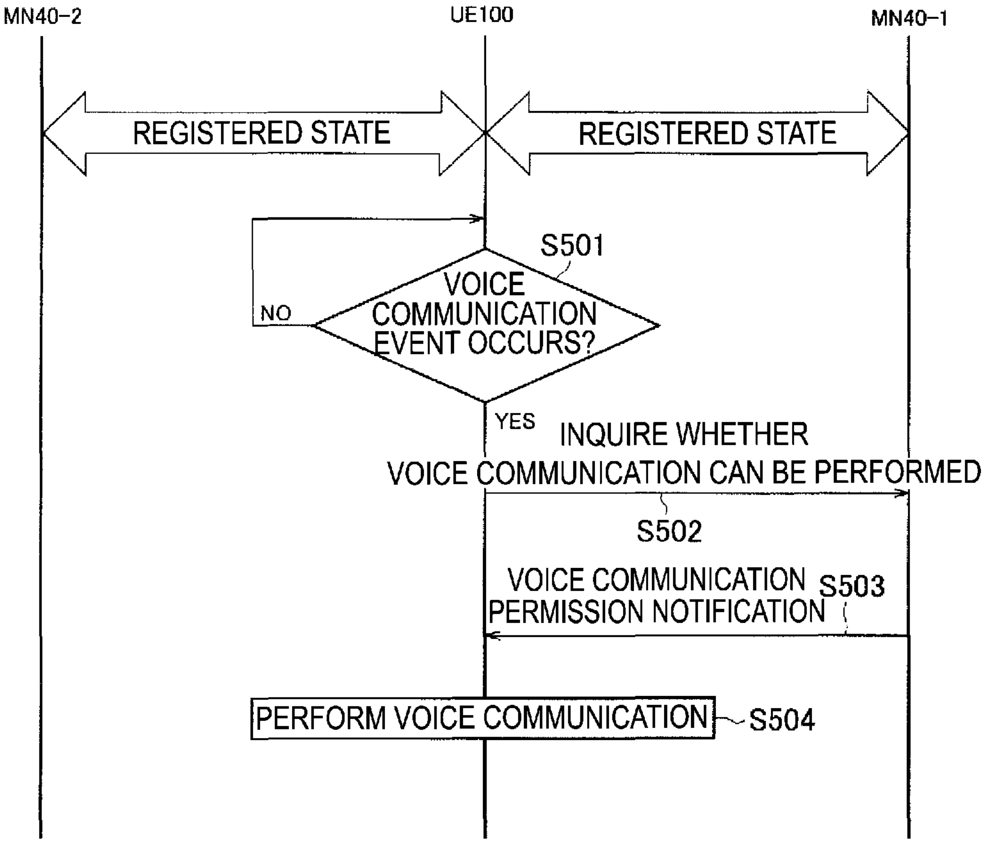
FIG. 12 is a diagram illustrating operations according to a second embodiment.

FIG. 12 is a diagram illustrating operations according to the second embodiment.

In step S501, the UE 100 determines whether a voice communication event occurs in the NW 40-2. When the UE 100 determines that the voice communication event occurs (step S501: YES), the UE 100 advances the processing to step S502.

The voice communication event indicates that the user of the UE 100 sends outgoing voice via the NW 40-2, or that the UE 100 receives a paging message to notify incoming voice.

In step S502, the UE 100 inquiries of the MN 40-1 whether the voice communication is permitted to be performed for the UE 100.

In step S503, the UE 100 receives a permission notification indicating that the voice communication is permitted to be performed from the MN 40-1.

In Step S504, the UE 100 performs the voice communication in response to receiving the permission notification. Note that the UE 100 not receiving the permission notification does not perform the voice communication.

Third Embodiment

A third embodiment assumes that the NW 40-1 and the NW 40-2 belong to the same communication operator.

In the third embodiment, when the UE 100 registers with both the NW 40-1 and the NW 40-2, the UE 100 transmits information indicating that the UE 100 is in a state of registering with both the MN 40-1 and the MN 40-2 (MUSIM state) (hereinafter, "MUSIM state information") to both the NW 40-1 and the NW 40-2. This allows the NW 40-1 and the NW 40-2 to recognize that the same UE 100 registers with both the NW 40-1 and the NW 40-2. Accordingly, the NW 40-1 and the NW 40-2 can cooperate with each other to appropriately perform communication with the UE 100.

When the UE 100 is in the RRC connected state in both the NW 40-1 and the NW 40-2, the UE 100 may transmit the MUSIM state information further indicating this state.

A transmission destination of the MUSIM state information is the AMF 300 (both the AMF 300-1 and the AMF 300-2) and/or the gNB 200 (both the gNB 200-1 and the gNB 200-2). The AMF 300-1 may transfer the MUSIM state information received from the UE 100 to the gNB 200-1. The gNB 200-1 may transfer the MUSIM state information received from the UE 100 to the AMF 300-1. The gNB 200-1 may store the MUSIM state information received from the UE 100 as part of the UE context of the UE 100.

When the transmission destination of the MUSIM state information is the AMF 300, the UE 100 may transmit the MUSIM state information together with information indicating that the registration with the NW 40-1 and the registration with the NW 40-2 belong to the same UE 100. Such information may indicate that the temporary subscriber identifiers (such as 5G-S-TMSI) assigned from both NWs 40 belong to the same UE 100, for example.

When the transmission destination of the MUSIM state information is the gNB 200 and the UE 100 is in the RRC connected state in both the NW 40-1 and the NW 40-2, the UE 100 may transmit information indicating that the RRC connection in the NW 40-1 and the RRC connection in the NW 40-2 belong to the same UE 100 along with the MUSIM state information. Such information may indicate that network temporary identifiers (such as C-RNTI) assigned from both NWs 40 belong to the same UE 100, for example.

When the UE 100 in the MUSIM state is deregistered in any one of the NW 40-1 and the NW 40-2, the UE 100 may transmit information indicating the deregistration to the other NW.

Other Embodiments

The embodiments described above may not only be separately and independently implemented, but also be implemented in combination of two or more embodiments.

In the first embodiment described above, the timing information identifies the execution timing, which is the timing for performing the communication in the NW 40-2, without limitation. The timing information may be information indicating a communicable timing at which communication with the NW 40-1 can be performed. In this case, the NW 40-1 can schedule communication with the UE 100 at the communicable timing.

A program that causes a computer to execute each of the processing operations according to the embodiments described above may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Embodiments have been described above in detail with reference to the drawings, but specific configurations are not limited to those described above, and various design variation can be made without departing from the gist of the present disclosure.

REFERENCE SIGNS

100: UE
110: Receiver
120: Transmitter
130: Controller
200: gNB
210: Transmitter
220: Receiver
230: Controller
260: Backhaul communicator
300: AMF
310: Controller
320: Backhaul communicator

The invention claimed is:

1. A communication control method using a user equipment, the user equipment comprising a first subscriber identity module (SIM) corresponding to a first mobile network and a second SIM corresponding to a second mobile network, the method comprising receiving, by the user equipment from the first mobile network, information related to whether the user equipment is configured to transmit timing information, the timing information being based on an execution timing that is a timing at which communication is performed in the second mobile network, determining, by the user equipment, that one of the first mobile network and the second mobile network is a priority network and that the other one of the first mobile network and the second mobile network is a non-priority network, determining, by the user equipment, whether transmission of the timing information is permitted based on the information related to transmission of the timing information, and transmitting, by the user equipment, the timing information to the first mobile network determined to be the non-priority network in response to determining that transmission of the timing information is permitted.

2. The communication control method according to claim 1, wherein the timing information comprises information for identifying a timing for the first mobile network based on the execution timing.

3. The communication control method according to claim 1, further comprising transmitting, by the user equipment to a base station in the first mobile network, a preferred RRC state in the first mobile network.

4. The communication control method according to claim 1, comprising receiving, by a base station in the first mobile network, the timing information, and transmitting, from the base station, Handover Preparation Information message in a handover procedure including a UE context of the user equipment, a part of which is the timing information.

5. The communication control method according to claim 1, comprising configuring, by a base station in the first mobile network to the user equipment, a communication gap in which the user equipment does not perform transmission and reception to the first mobile network.

6. The communication control method according to claim 1, comprising transmitting, by the user equipment, the timing information to the first mobile network in response to occurrence of a predetermined event, wherein the predetermined event indicates that the user equipment in the second mobile network transitions from a radio resource control (RRC) connected state to an RRC inactive state or that the user equipment transitions to the RRC connected state in the first mobile network.

7. A user equipment comprising a first subscriber identity module (SIM) corresponding to a first mobile network and a second SIM corresponding to a second mobile network, the user equipment comprising a receiver configured to receive, from the first mobile network, information related to whether the user equipment is configured to transmit timing information, the timing information being based on an execution timing that is a timing at which communication is performed in the second mobile network, a controller configured to determine that one of the first mobile network and the second mobile network is a priority network and that the other one of the first mobile network and the second mobile network is a non-priority network, and whether transmission of the timing information is permitted based on the information related to transmission of the timing information, and a transmitter configured to transmit the timing information to the first mobile network determined to be the non-priority network in response to determining that transmission of the timing information is permitted.

8. A chipset for controlling a user equipment comprising a first subscriber identity module (SIM) corresponding to a first mobile network and a second SIM corresponding to a second mobile network, the chipset comprising a processor and a memory coupled to the processor, the processor configured to receive, from the first mobile network, information related to whether the user equipment is configured to transmit timing information, the timing information being based on an execution timing that is a timing at which communication is performed in the second mobile network, determine that one of the first mobile network and the second mobile network is a priority network and that the other one of the first mobile network and the second mobile network is a non-priority network, determine whether transmission of the timing information is permitted based on the information related to transmission of the timing information, and transmit the timing information to the first mobile network determined to be the non-priority network in response to determining that transmission of the timing information is permitted.

* * * * *